(12) United States Patent
Yu et al.

(10) Patent No.: US 10,410,481 B2
(45) Date of Patent: Sep. 10, 2019

(54) CONFIGURING POINT-OF-SALE (POS) APPLICATIONS TO COMMUNICATE WITH PERIPHERAL DEVICES IN A POS SYSTEM

(71) Applicant: Toshiba Global Commerce Solutions Holdings Corporation, Tokyo (JP)

(72) Inventors: Tong Yu, Cary, NC (US); Yongan Wang, Cary, NC (US); Xianhua Liu, Chapel Hill, NC (US); Shaobo Dou, Chapel Hill, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 0 days.

(21) Appl. No.: 15/993,011

(22) Filed: May 30, 2018

(65) Prior Publication Data

US 2018/0276956 A1    Sep. 27, 2018

Related U.S. Application Data

(63) Continuation of application No. 15/703,315, filed on Sep. 13, 2017, now Pat. No. 9,990,812, which is a continuation of application No. 14/674,132, filed on Mar. 31, 2015, now Pat. No. 9,928,697.

(51) Int. Cl.
| | |
|---|---|
| *G07G 1/12* | (2006.01) |
| *G07G 1/00* | (2006.01) |
| *G06F 13/42* | (2006.01) |
| *G06Q 20/20* | (2012.01) |

(52) U.S. Cl.
CPC ............. *G07G 1/12* (2013.01); *G07G 1/0009* (2013.01); *G06F 13/42* (2013.01); *G06Q 20/20* (2013.01)

(58) Field of Classification Search
CPC .................................. G06F 13/42; G07G 1/12
See application file for complete search history.

(56) References Cited

U.S. PATENT DOCUMENTS

| | | | | |
|---|---|---|---|---|
| 6,845,363 B1 * | 1/2005 | Matsubara | ............. | G06Q 20/20 705/16 |
| 7,971,782 B1 * | 7/2011 | Shams | ................... | G06Q 20/20 235/379 |
| 9,928,697 B2 * | 3/2018 | Yu | ......................... | G07G 1/0009 |
| 9,990,812 B2 * | 6/2018 | Yu | ......................... | G07G 1/0009 |
| 2013/0262248 A1 * | 10/2013 | Kim | ..................... | G07G 1/0018 705/17 |
| 2013/0290591 A1 * | 10/2013 | Schwarzkopf | ........ | G06F 1/1632 710/303 |

* cited by examiner

*Primary Examiner* — Tammara R Peyton
(74) *Attorney, Agent, or Firm* — Coats & Bennett, PLLC

(57) ABSTRACT

A Point-of-Sale (POS) terminal in a retail environment is communicatively connected to one or more POS peripheral devices. Each POS peripheral device is associated with a configuration file that defines configuration settings for the POS peripheral device and environmental context information for the POS terminal and the POS controller. The configuration files are prioritized according to various criteria, and used to re-configure POS applications executing on the POS to operate optimally with the particular POS peripheral device. Additionally, the prioritized configuration files control the POS applications to update the configuration information.

20 Claims, 8 Drawing Sheets

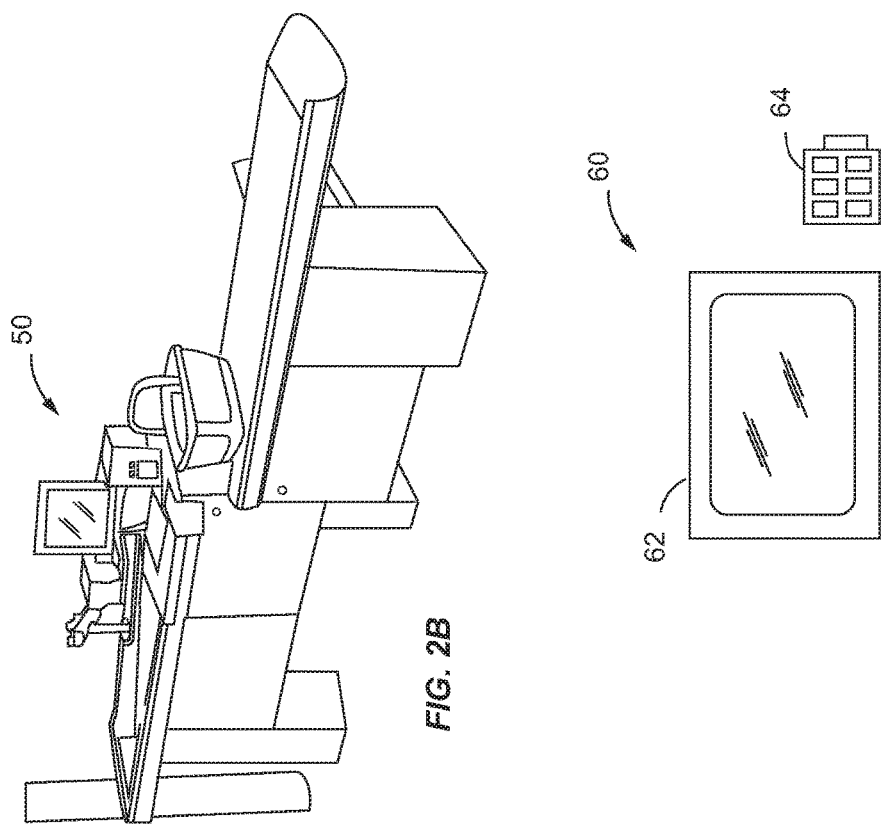
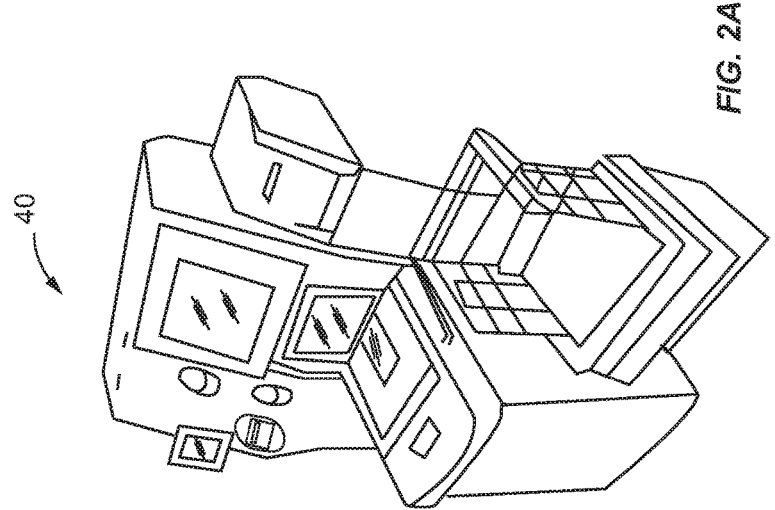

CONFIGURING POINT-OF-SALE (POS) APPLICATIONS TO COMMUNICATE WITH PERIPHERAL DEVICES IN A POS SYSTEM

RELATED APPLICATIONS

The present application is a continuation of U.S. patent application Ser. No. 15/703,315 filed on Sep. 13, 2017, which in turn, is a continuation of U.S. patent application Ser. No. 14/674,132 filed on Mar. 31, 2015, now U.S. Pat. No. 9,928,697, each of which is incorporated by reference herein in its entirety.

TECHNICAL FIELD

The present disclosure relates generally to Point-of-Sale (POS) systems, and more particularly, to configuring POS application programs executing on POS terminals to communicate with POS peripheral devices to effect retail transactions.

BACKGROUND

The retail Point of Sale (POS) terminal has evolved from a mechanical cash register to a sophisticated, networked terminal capable of rapidly identifying selected items for purchase (e.g., via optical scanning or RFID reading), tallying the order, accepting payment in a variety of forms, and generating a customer receipt. Many modern POS terminals also have additional capabilities, such as transmitting or e-mailing an electronic version of the receipt to a customer.

Generally, POS terminals connect to a number of different peripheral devices, such as pinpads, printers, optical scanners, and the like. When performing customer transactions, a POS application executing on the POS terminal communicates data and information with these peripheral devices using a well-known communication protocol (e.g., TCP/IP over USB, RS232, USB, RS232 over USB, etc.).

However, before data and information can be exchanged, the POS application must first be configured to communicate with the peripheral devices. For example, in cases where the RS232 protocol is utilized to connect a POS terminal and a POS peripheral device, certain settings for the POS application such as the baud rate, data bits, parity, handshake, and the like, must first be configured. Additionally, from time-to-time, the peripheral devices may be swapped or replaced with other peripheral devices, or the POS terminal that executes the POS application may be reloaded. When such events such as these occur, it becomes necessary to repeat the configuration process to help ensure that the POS application operates optimally with the peripheral device.

BRIEF DESCRIPTION OF THE DRAWINGS

FIGS. 2A-2C are perspective views illustrating exemplary POS terminals and POS peripheral devices configurable according to embodiments of the present disclosure.

DETAILED DESCRIPTION

Embodiments of the present disclosure provide, for a retail environment (e.g., a store), a computer-implemented method, a Point-of-Sale (POS) apparatus (e.g., a POS terminal), and a corresponding computer-readable storage medium for configuring a POS application program executing on the POS terminal to operate optimally with a peripheral device connected to the POS terminal.

More particularly, the POS application obtains one or more configuration files for a peripheral device whenever an event occurs that triggers a reconfiguration of the POS application (e.g., when the peripheral device has been swapped or replaced or modified or whenever software on the POS terminal has been reloaded). Each configuration file contains configuration data (e.g., settings and data parameters) needed by the POS application to exchange data and information with the peripheral device, and is assigned a priority level that corresponds to a level of optimization for the peripheral device in the current retail environment. The POS application selects one of the POS configurations based on the priority level, and then configures itself with the configuration data from that file. Additionally, based on the assigned priority level, the POS application is controlled to update its configuration for the particular peripheral device.

By way of example, configuration files with lower priority levels may control the POS application to obtain additional configuration data from one or more other sources (e.g., a username/password for the peripheral device from an operator, etc.). However, configuration files having higher assigned priority levels could mean that the settings and parameters for the peripheral are highly relevant and accurate. A POS application that has never before been configured, or a POS application that requires an update to its configuration, may utilize the settings and parameters with a high degree of confidence that the settings are appropriate. Of course, POS applications having a configuration that already matches the parameters and settings in such a configuration file may not have to do much, if anything, to update its configuration with the recommended settings. Thus, the higher priority level of some configuration files means that there is less interruption to an operator in configuring the POS application. Further, the present disclosure helps to ensure that communication and data exchange the POS application and the peripheral devices is optimal.

Figure 1:
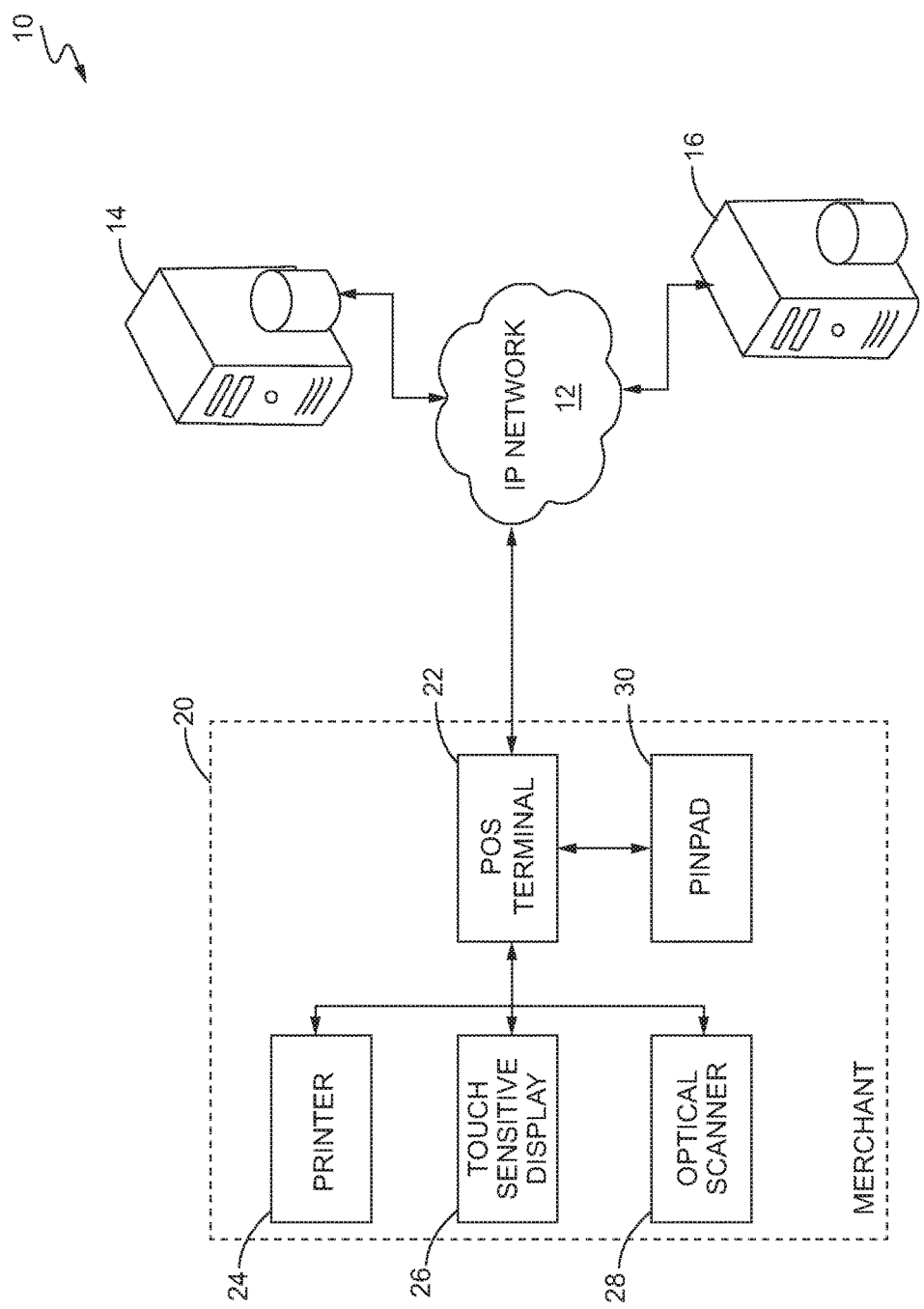
FIG. 1 is a functional block diagram illustrating A Point-of-Sale (POS) system configured according to one embodiment of the present disclosure.

Turning now to the drawings, FIG. 1 is a functional block diagram illustrating a Point-of-Sale (POS) system 10 configured according to one embodiment of the present disclosure. Those of ordinary skill in the art will readily appreciate that the components seen in FIG. 1 are merely illustrative of a POS system that may be employed by a merchant in a retail environment, and that POS systems may comprise more or fewer components as needed or desired.

In this embodiment, POS system 10 comprises an IP network 12, a control server 14, an enterprise server 16, and a merchant retail site 20. The merchant site 20 further includes the various components necessary to facilitate customer transactions with respect to the sale of products and/or services that are offered by the merchant site 20. As seen in this embodiment, those components include a POS terminal 22 communicatively connected to one or more peripheral devices, such as printer 24, display 26, optical scanner 28, and pinpad 30.

In operation, a sales associate, for example, uses optical scanner 28 to scan a product code (e.g., a barcode, a matrix code, a 3D code) associated with a product selected by a customer for purchase. The POS terminal 22 then sends the details obtained from the optical scan of the product label to a centralized pricing server (not shown) via network 12 to obtain pricing information about the product. Information returned by the pricing server is sent by the POS terminal 22 to display 26 for display to the customer. Once all products have been scanned, the customer may utilize pinpad 30 to effect payment, such as swipe a credit card or gift card, select a payment type, and enter personal security information (e.g., a PIN or authorization code). The details of the transaction are then sent to the printer 24 and printed as a receipt of the customer.

As previously stated, POS applications executing on POS terminal 22 are configured such that they are optimized to communicate with the various peripheral devices at the merchant site (i.e., printer 24, display 26, optical scanner 28, and pinpad 30). However, because of various circumstances, these configurations may change from time-to-time. Therefore, the present disclosure configures the POS applications executing on POS terminal 22 to "self-reconfigure" upon detecting a triggering event. Further, the present disclosure configures the POS applications to select a configuration file that is optimized for the retail environment in which the peripheral device operates. If an optimal configuration cannot be obtained, the present disclosure configures the POS application to autonomously obtain additional configuration information to ensure optimal communications with the peripheral device.

To that end, the IP network 12 may comprise one or more public or private communication networks that communicate packets of data between the merchant site 20 and the enterprise servers 14, 16. In some embodiments, IP network 12 will also carry data packets between the various components of merchant site 20. Such IP networks 12 and the methods they use to carry packet data are well-known in the art; however, for completeness, IP network 12 may comprise the Internet and/or any other public and private networks capable of communicating data packets using the well-understood Transmission Control Part (TCP)/Internet Protocol (IP). In some embodiments, IP network 12 represents the "cloud." In these cases, one or both of the servers 14, 16 are remotely located in the "cloud."

The control server 14 is a computing device that is configured to control the configuration and operation of the various components of merchant site 20. In one embodiment, for example, control server 14 has access to a database (not shown) or other memory storage device that stores configuration files for each of the peripheral devices 24, 26, 28, 30. Each configuration file corresponds to a particular peripheral device (e.g., pinpad 30), and contains information that identifies its various configuration parameters and settings. Such parameters include, but are not limited to, a product ID, a vendor ID, a serial number, firmware version ID, port ID, Operating System (OS) version, and the like. Additionally, the configuration files may also comprise, or be otherwise associated with, one or more environmental parameters that identify the context of the retail environment in which the POS terminal 22 operates. By way of example only, these environmental parameters may include, but are not limited to, a controller ID, a POS terminal ID, a time stamp, POS application version and/or revision information, OS version and/or revision information, store ID, merchant ID, and the like. According to the present disclosure, the control server 14 provides a POS application executing on the POS terminal 22 with a plurality of configuration files upon initialization, upon receiving a request for the files, or upon detecting that the POS terminal 22 has been reloaded or rebooted, for example.

While there is no requirement for co-location, the control server 14 is generally under the control of the merchant site 20, either directly or indirectly. However, in some cases, the control server 14 may not store some or all the configuration files for each peripheral device. For example, a merchant may have purchased a new pinpad 30 for which a configuration file is not available at control server 14. Alternatively, control server 14 may not have access to the latest version of a configuration file for a given pinpad 30. Typically, though, the vendors of the various peripheral devices will store such files and versions on their own enterprise server 16. Therefore, in certain situations (e.g., when a configuration file cannot be retrieved from via the control server 14) the present disclosure configures the POS terminal 22 to retrieve these file(s) from enterprise server 16.

At the merchant site 20, the POS terminal 22, as stated above, executes POS application programs that operate with the various peripheral devices 24, 26, 28, 30 to facilitate the sale of products and services offered by the merchant. To this end, POS terminal 22 may comprise any type of POS terminal known in the art. As seen in FIG. 2A, for example, POS terminal 22 may be a "self-checkout" station 40 positioned at a fixed location in merchant site 20. With such stations, a customer will typically perform the steps required to perform the customer transaction with little or no help form the merchant. Alternatively, as seen in FIG. 2B, POS terminal 22 may be embodied as an "employee assisted" checkout station 50 in which the sales associate performs the transaction for the customer. In at least some embodiments, such as that seen in FIG. 2C, POS terminal 22 is embodied as a Mobile Point-of-Sale (MPOS) terminal 60 comprised of a tablet device 62 and a corresponding portable payment terminal (PPT) 64. As is known in the art, MPOS devices 60 allow a sales associates to roam the aisles of the merchant's store to perform customer transactions, thereby saving the customer the time it takes to wait in line at a fixed checkout location.

Regardless of the type of POS terminal 22, however, each of the terminals 40, 50, 60 have or are associated with one or more peripheral devices that are advantageously optimized to operate with a POS application executing at the terminal 40, 50, 60 according to the present disclosure.

Figure 3:
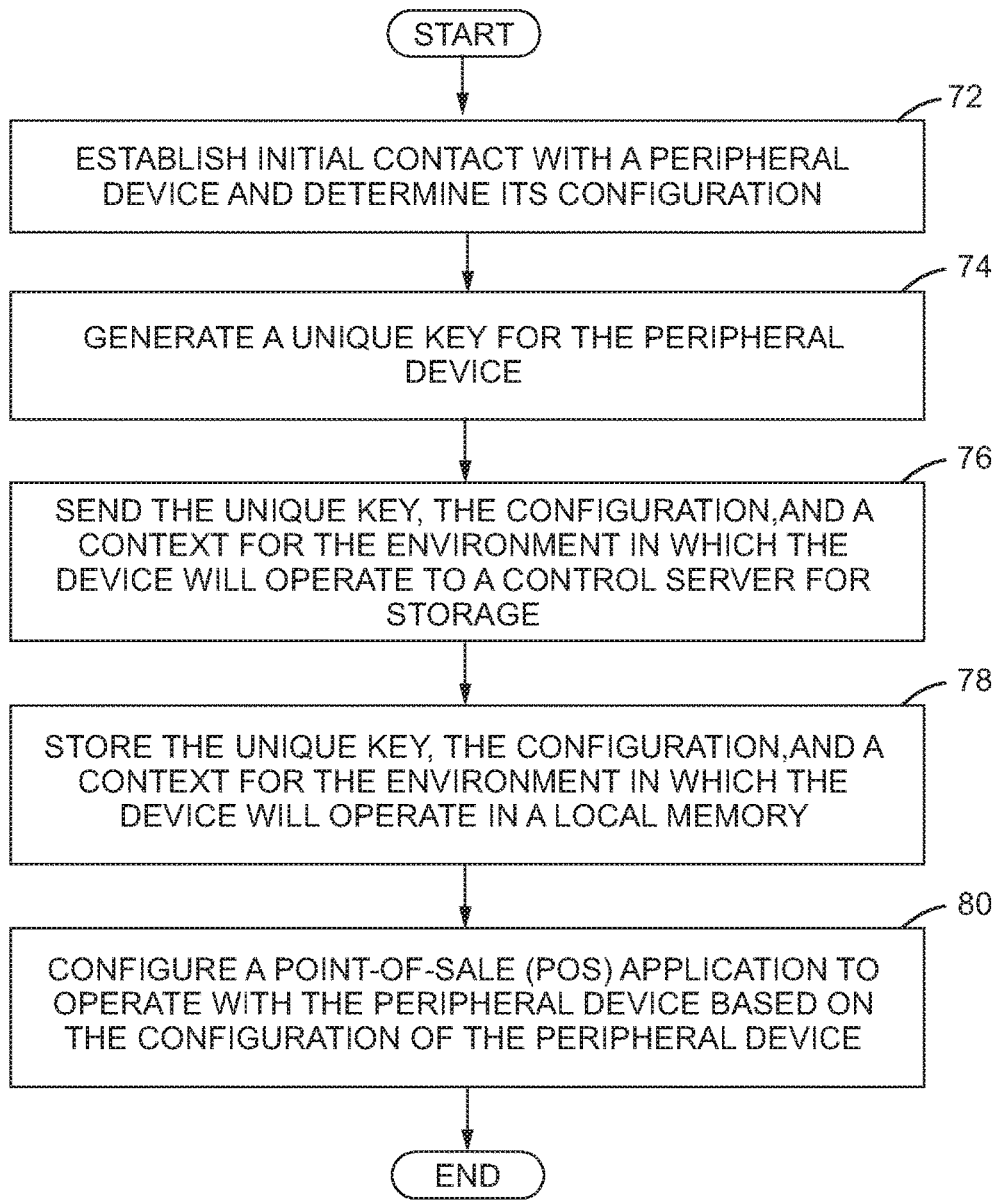
FIG. 3 is a flow diagram illustrating a method for initially configuring a POS application executing on a POS terminal to communicate with a POS peripheral device according to one embodiment of the present disclosure.

The POS applications executing on POS terminal 22 are initially configured to operate with peripheral devices 24, 26, 28, 30. FIG. 3 is a flow diagram illustrating a method 70 for initially configuring a POS application executing on a POS terminal to communicate with the POS peripheral devices 24, 26, 28, 30 according to one embodiment of the present disclosure. For illustrative purposes only, method 70 is described in the context of peripheral device being pinpad 30. However, those of ordinary skill in the art should readily appreciate that the method 70, as well as all of the embodiments of the present disclosure, are equally as applicable to any peripheral device connected to and communicating with the POS applications executing on POS terminal 22.

Method 70 begins with the POS application executing on POS terminal 22 establishing initial contact with pinpad 30 and determining its current configuration (box 72). Communications may be established using any known method and protocol including, but not limited to, BLUETOOTH, WiFi, TCP/IP, USB, RS232, and the like, and may be facilitated in at least some cases, by the hardware circuits and other software of POS terminal 22 and pinpad 30. The POS application then generates a unique key for the pinpad 30 (box 74). This unique key may be generated based, for example, on configuration data received from pinpad 30, and will later be utilized by the POS application to retrieve one or more configuration files associated with pinpad 30. The POS application then sends the unique key, the configuration data, and the context of the current working environment of the POS terminal 22 to control server 14 for storage (box 76). Provided that POS terminal 22 has local storage media (e.g., a hard drive, USB drive, CD, DVD, and the like), the POS application may also store the unique key, the configuration data, and the environmental context in the local memory (box 78). Finally, the POS application will utilize the configuration data to configure itself for operation with the pinpad 30 (box 80). As stated above, such configuration data may identify a particular port over which the pinpad 30 will send and receive data, as well as one or more identifiers and other information, such as firmware version and revision information, that may be helpful in configuring the POS application to communicate optimally with the pinpad 30.

It should be noted that the configuration data for the initial configuration of the POS application need not be read entirely from pinpad 30. In some embodiments, for example, the operator of the POS terminal 22 is presented with a series of one or more prompts that prompt the user to manually enter information not specifically included as configuration information in the pinpad 30. Such information may include, for example, a username and password required to communicate with the pinpad 30, or information related to predetermined environmental contexts in which the POS terminal is operating (e.g., POS system ID, merchant ID, POS terminal ID, etc.). Additionally, other embodiments may require the POS application to retrieve at least some of the initial configuration data from a remote device via network 12. Alternatively, the initial configuration information may be retrieved by the POS application from multiple devices and the user.

Figure 4A:
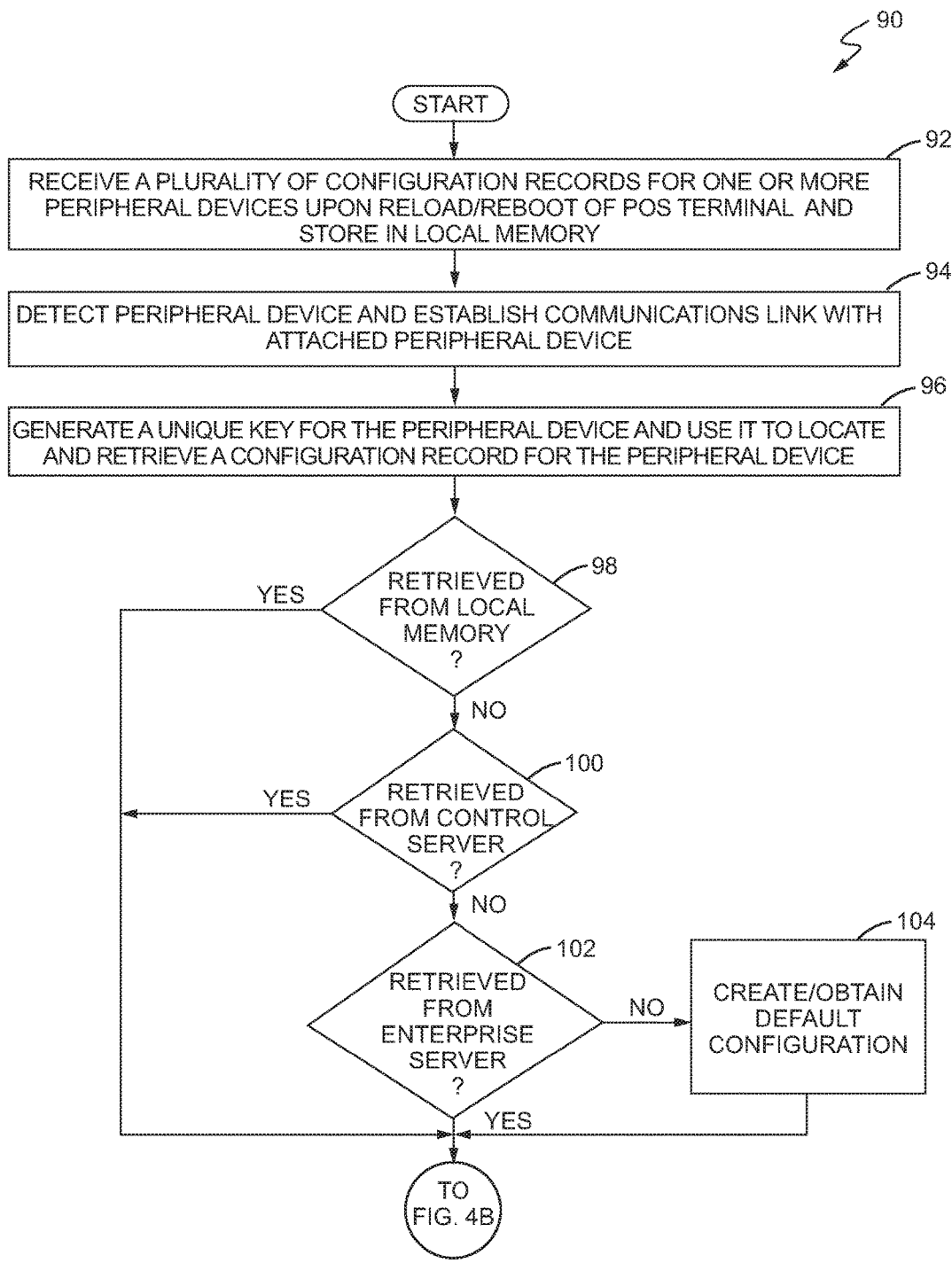
FIGS. 4A-4B are flow diagrams illustrating a method for configuring a POS application executing on a POS terminal to communicate with a POS peripheral device responsive to a predetermined event according to one embodiment of the present disclosure.
Figure 4B:
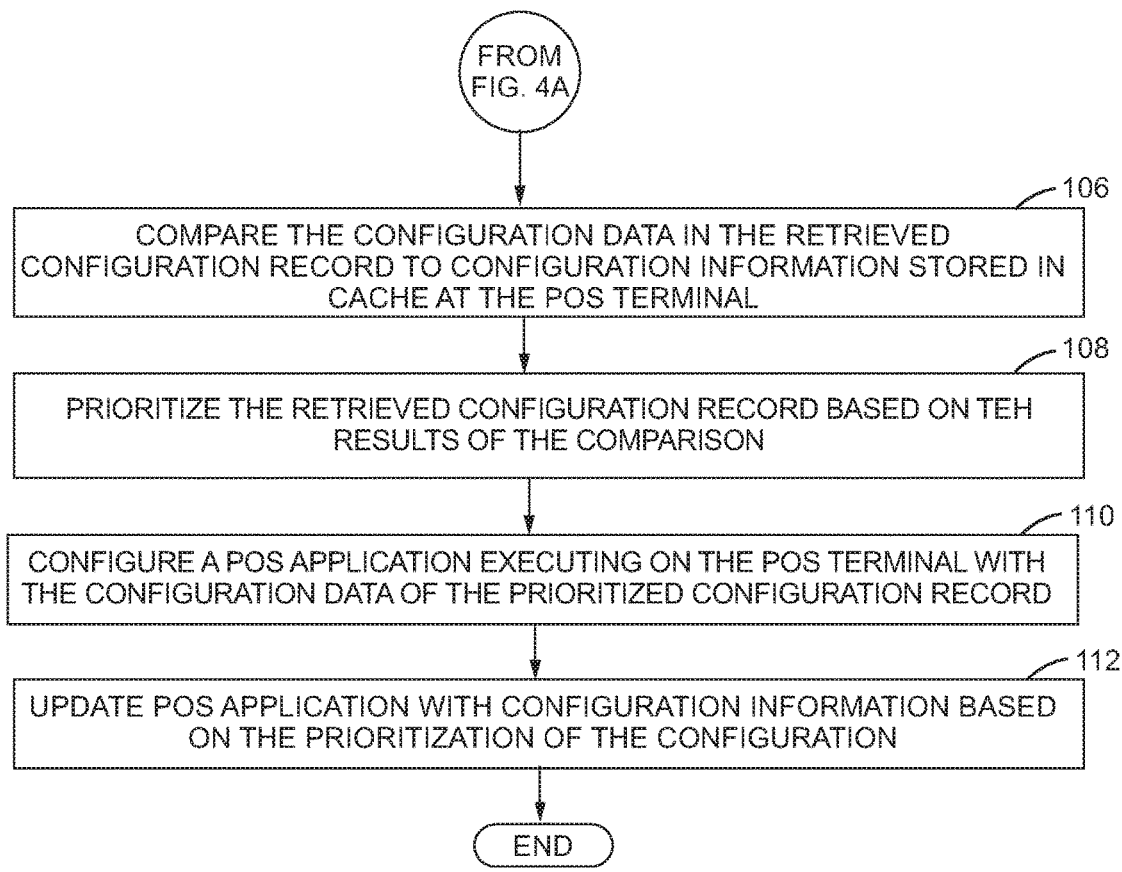

FIGS. 4A-4B are flow diagrams illustrating a method 90 for configuring a POS application executing on a POS terminal to communicate with a POS peripheral device such as pinpad 30 responsive to a predetermined event according to one embodiment of the present disclosure. As seen in FIG. 4A, method 90 begins with the POS terminal 22 receiving a plurality of configuration files for one or more peripheral devices, such as pinpad 30, responsive to the POS terminal 22 being reloaded with software or rebooted, for example. The configuration files may be stored in a local memory circuit at POS terminal 22, if POS terminal 22 is so equipped with such memory (box 92). Next, the pinpad 30 is detected at POS terminal 22, and a communications link is established with the pinpad 30 (box 94). By way of example only, the communications link may be established using BLUETOOTH, WiFi, RS232, USB, TCP/IP, any other well-known communications protocol. Once the link is established, a unique key is generated for the pinpad 30, as previously described (box 96).

Next, the POS application executing at the POS terminal 22 will search for, and load, a configuration file that will optimize its operation with pinpad 30. Particularly, the POS application will first use the generated key to search for a configuration file in the local memory circuit (box 98). If a configuration file or files cannot be found locally (no at box 98), the POS application will generate and send a request message to the control server 14 to determine if a configuration file or files is stored there (box 100). If not (no at box 100), the POS application will generate and send a request message to the enterprise server 16 to determine whether the enterprise server 16 is storing a configuration file or files for pinpad 30 (box 102). If all the locations checked by the POS application fail to produce a configuration file for the pinpad 30 (no at box 102), POS application will simply generate a default configuration file for pinpad 30 (box 104). While the default configuration file may comprise any of the parameters needed or desired, one embodiment of the present disclosure includes only a minimum number of configuration parameters and settings needed for the POS application to communicate with the pinpad 30.

Regardless of whether the POS application locates a configuration file for pinpad 30 (boxes 98, 100, 102), or is forced to generate and assign a default configuration file for pinpad 30 (box 104), the POS application executing on the POS terminal 22 will determine how relevant the configuration file is to the operation of the pinpad 30 in the context of the current working environment. Specifically, as seen in FIG. 4B, the POS application will compare the configuration data in each of the configuration files to a set of configuration parameters and settings in a cache at POS terminal 22 (box 106). The information in the cache represents the last known good settings and parameters the POS application had with respect to the pinpad 30. Based on the results of that comparison, the POS application will assign a priority to the configuration file (box 108). The priority level comprises, in one embodiment, an integer value representation that indicates how well the parameters and settings in the configuration data match with the parameters and settings in the POS terminal 22 cache.

By way of example, if a configuration file is found in a local memory circuit (box 98), or if each of the parameters in the configuration file matches those in cache, it may indicate that the local memory circuit maintained a copy of the appropriate configuration file. In such cases, the POS application may assign a high priority level of '1' to the configuration file indicating a high level of confidence that those particular parameters and settings represent the most optimal configuration for the pinpad 30 (box 108). This value may then be added to the configuration file or associated with the configuration file.

Alternatively, if the configuration file is located in the local memory circuit (box 98) but only some of the configuration data matches, it may indicate that a different type of pinpad 30 was connected to POS terminal 22. For example, the controller ID or store ID parameter retrieved for the pinpad 30 may be different from the information stored in the cache at POS terminal 22, thereby indicating that the merchant installed a new pinpad 30, or installed a pinpad that was originally at another store. Another reason for a difference is that the pinpad 30 may have a different firmware version. In these cases, the POS application may assign the configuration file a different priority level of 2 (box 108). Because this level is not the highest priority level, the POS application will be triggered to perform an action to update at least some of its configuration parameters and settings.

If a configuration file for pinpad 30 was found at the control server 14, or if the comparison yielded a match rate of less than a predetermined threshold (box 100), the POS application might assign a priority level of '3' to the configuration file (box 108). If the configuration file for pinpad 30 was found at the enterprise server 16, or the comparison results yielded a match rate that was less than another predetermined threshold value (box 102), POS application could assign a priority level of '4' to the configuration file (box 108). And if a default configuration file is generated, the POS application could assign the lowest priority level (e.g., '5') to the configuration file (box 108).

Regardless of the particular priority level assigned, however, the priority level is added to, or associated with, the configuration file. The POS application will use the parameters and settings in the prioritized configuration file to configure its own settings and parameters to operate with pinpad 30 (box 110). Although the configuration settings and parameters may not be optimal in some cases (e.g., where the priority level is low), it will still provide the POS application with at least the minimum configuration data needed to communicate with pinpad 30. However, it will also control the POS application to update the configuration settings and parameters to ensure that the operation of the pinpad 30 and the POS application communicating with pinpad 30 is optimal (box 112).

For example, in one embodiment, a POS application configuring itself according to a configuration file having a priority level of '1' may simply provide a prompt to request that the user enter specific information that was missing from the configuration file, or was different from the cached configuration, or that needs to be verified. However, because of the close match required for a priority '1' rating, the amount of information requested from the user, and thus, the amount of inconvenience to the user, is minimal. Further, with the present embodiments, the exact type of information required is requested from the user, which eliminates or at least greatly reduces the length of time the user needs to finish configuring the POS application for operation with pinpad 30.

On the other end of the spectrum, a POS application configuring itself with a configuration file having a priority level of '5' (e.g., signifying that the configuration is a default configuration) might require the user to provide much more information. However, even in such cases, the POS application is still provided with the minimum amount of configuration data required to operate with pinpad 30. Therefore, even though operation may not be optimal, the configuration still allows a customer to utilize the pinpad 30. Additionally, even though the user may be required to provide more information, only the exact information that is required to optimize the configuration is requested by the POS application, thereby simplifying a complex and cumbersome process for the user. Of course, once an optimal configuration file is identified or achieved, the POS application can store the optimized configuration file in one or both of the local memory circuit of POS terminal 22 and the control server 14.

Figure 5:
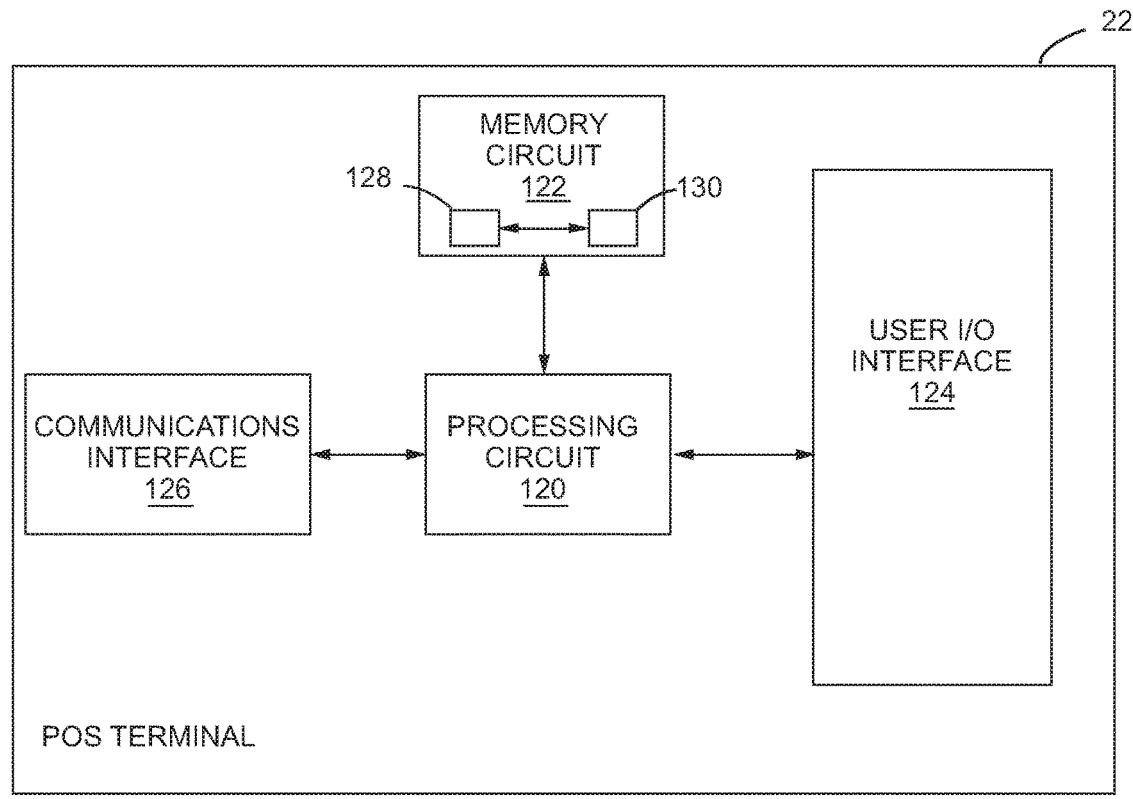
FIG. 5 is a block diagram illustrating some functional components of a POS terminal configured according to one embodiment of the present disclosure.

FIG. 5 is a block diagram illustrating some functional components of a POS terminal 22 configured according to one embodiment of the present disclosure. Those of ordinary skill in the art will readily appreciate that FIG. 5 illustrates only some of the components of POS terminal 22, and that POS terminal 22 may comprise more or fewer components as needed or desired.

As seen in FIG. 5, POS terminal 22 comprises a processing circuit 120, a memory circuit 122, a user I/O interface 124, and a communications interface 126. Additionally, the memory circuit 122 is configured to store a POS application 128 and one or more configuration files 130. According to one or more embodiments of the present disclosure, processing circuit 120 communicatively connects the memory circuit 122, the user I/O interface 124, and the communications interface 126 via one or more buses. Processing circuit 120 may comprise any sequential state machine capable of executing machine instructions stored as a machine-readable computer program (e.g., POS application 128 in the memory circuit 122), such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above.

The memory circuit 122 of the POS terminal 22 may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like. As seen in FIG. 5, the memory circuit 122 stores the POS application 128 that executes on POS terminal 22, as well as one or more of the configuration files 170 that contain the configuration parameters and settings for the POS application 128, as previously described. The configuration files 170 may be stored responsive to receiving the files during an initialization of the POS terminal 22, or alternatively, responsive to detecting a reload or reboot procedure performed at the POS terminal 22. In some cases, the POS terminal 22 receives one or more of the configuration files 170 in the background during normal operation, as well as updates the information in those files in the background during operation.

The user I/O input interface 124 comprises circuitry that is configured to receive user input signals into POS terminal 22, as well as to output information and data from POS terminal 22. For example, the user I/O input interface 124 may comprise the circuitry and software required for the POS terminal to operate with one or more of the peripheral devices 24, 26, 28, 30, as well as some other peripheral devices that are not particularly illustrated here. Such devices may include, but are not limited to, one or more of a pointing device (such as a mouse, stylus, touchpad, trackball, pointing stick, joystick), a microphone for speech input, an optical sensor for optical recognition of gestures, and a keypad or keyboard.

The communications interface 126 comprises circuitry configured to allow the POS terminal 22 to communicate data and information with one or more remote devices. By way of example, via communications interface 126 and network 12, the POS terminal 22 may communicate information and data with the control server and/or the enterprise server 16, as well as with one or more of the peripheral devices 24, 26, 28, 30. To that end, communications interface 126 may be configured to communicate using any of a wide variety of protocols including, but not limited to, WiFi, BLUETOOTH, TCP/IP, USB, RS232, and the like.

According to the embodiments of the present disclosure, the processing circuit 120 is configured to execute the POS application 128 to perform the embodiments described above. As such, processing circuit 120 is configured, according to the code and instructions that comprise the POS application 128, to retrieve a plurality of configuration files responsive to detecting a predetermined event, locate a particular configuration file for a given peripheral device, such as pinpad 30, prioritize the configuration file according to an analysis of whether the configuration file is likely to contain optimized settings for the pinpad 30, configure the POS application to operate with the pinpad 30 using the prioritized settings, and thereafter, update those settings, as needed, based on the priority level assigned to the configuration file.

Figure 6:
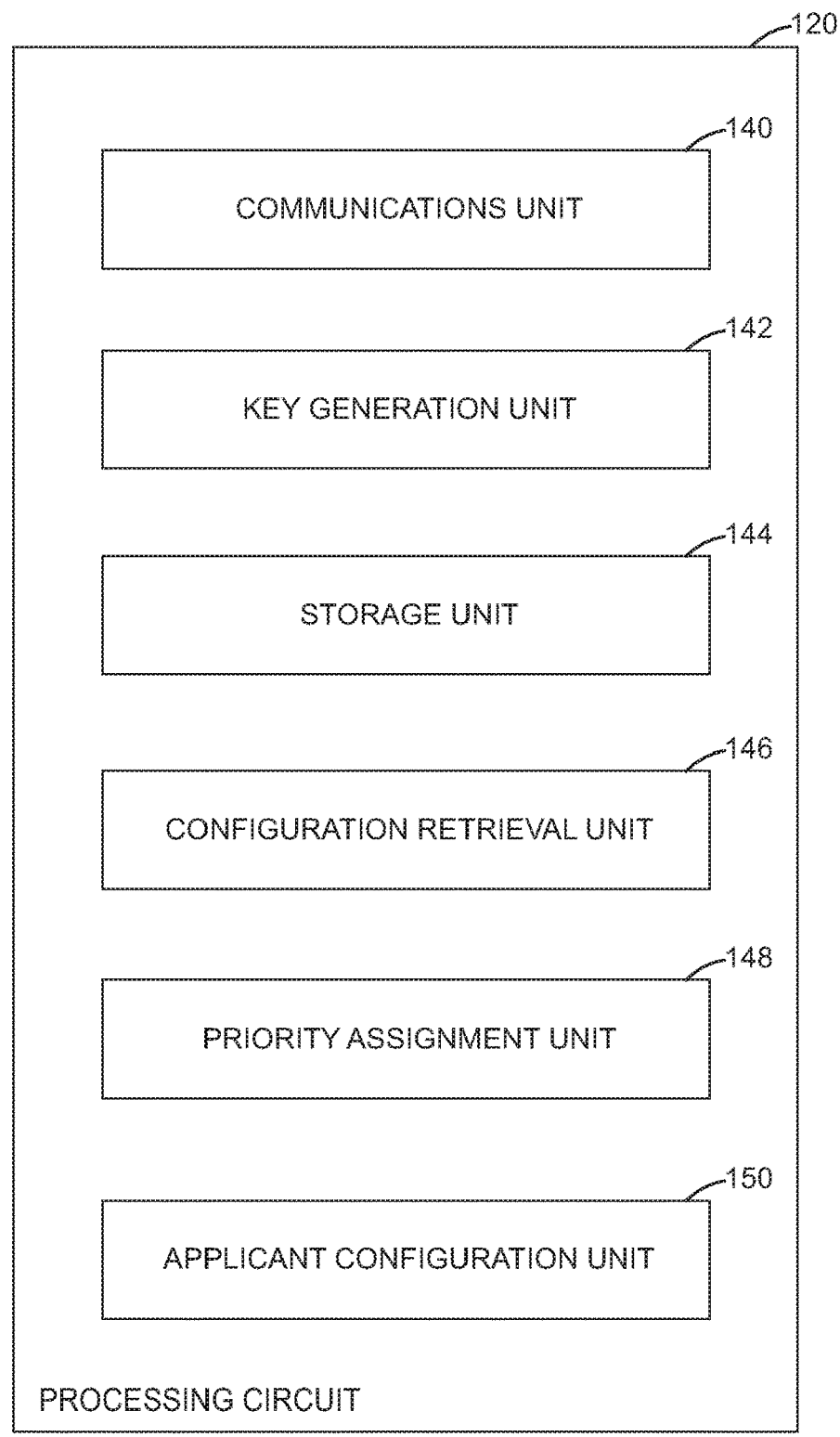
FIG. 6 is a logical block diagram illustrating physical units within the processing circuitry of a POS terminal configured according to embodiments of the present disclosure.

FIG. 6 illustrates an embodiment of the processing circuit 120 comprising physical hardware units. The processing circuit 120 comprises a communications unit 140, a key generation unit 142, a configuration file storage unit 144, a configuration file retrieval unit 146, a priority level assignment unit 148, and an application configuration unit 150.

The communications unit 140 is configured to receive one or more configuration files from any of a variety of remotely located devices. Such devices include the control server 14, the enterprise server 16, and each of the illustrated peripheral devices 24, 26, 28, 30. In addition, the communications unit is configured to communicate such data and information via a wire-based and/or wireless-based interface, as needed or desired. The key generation unit 142 is configured to generate a unique key for a given peripheral device 24, 26, 28, 30 upon receiving information associated with the given peripheral device 24, 26, 28, 30. Such information may include, for example, identifiers or other similar information that is unique to the peripheral device 24, 26, 28, 30. The configuration file storage unit 144 is configured to store the configuration files, and their respective updates, in memory circuit 122 and/or on control server 14. The configuration file retrieval unit 146 is configured to retrieve one or more configuration files from the memory circuit 122, and/or one or both of the servers 14, 16. If no configuration files are found, the configuration retrieval unit 146 may generate a default configuration file, as stated above. The priority assignment unit 148 is configured to compare the configuration information stored in a local cache at POS terminal 22 (if any) to the configuration data stored in the configuration file(s). Based on the results of that matching analysis, and/or on the location from where the configuration files are retrieved or generated, the priority assignment unit 148 is configured to assign a priority level to a configuration file. The application configuration unit 150 is configured to configure the POS application 128 according to the prioritized configuration file, as described above.

Figure 7:
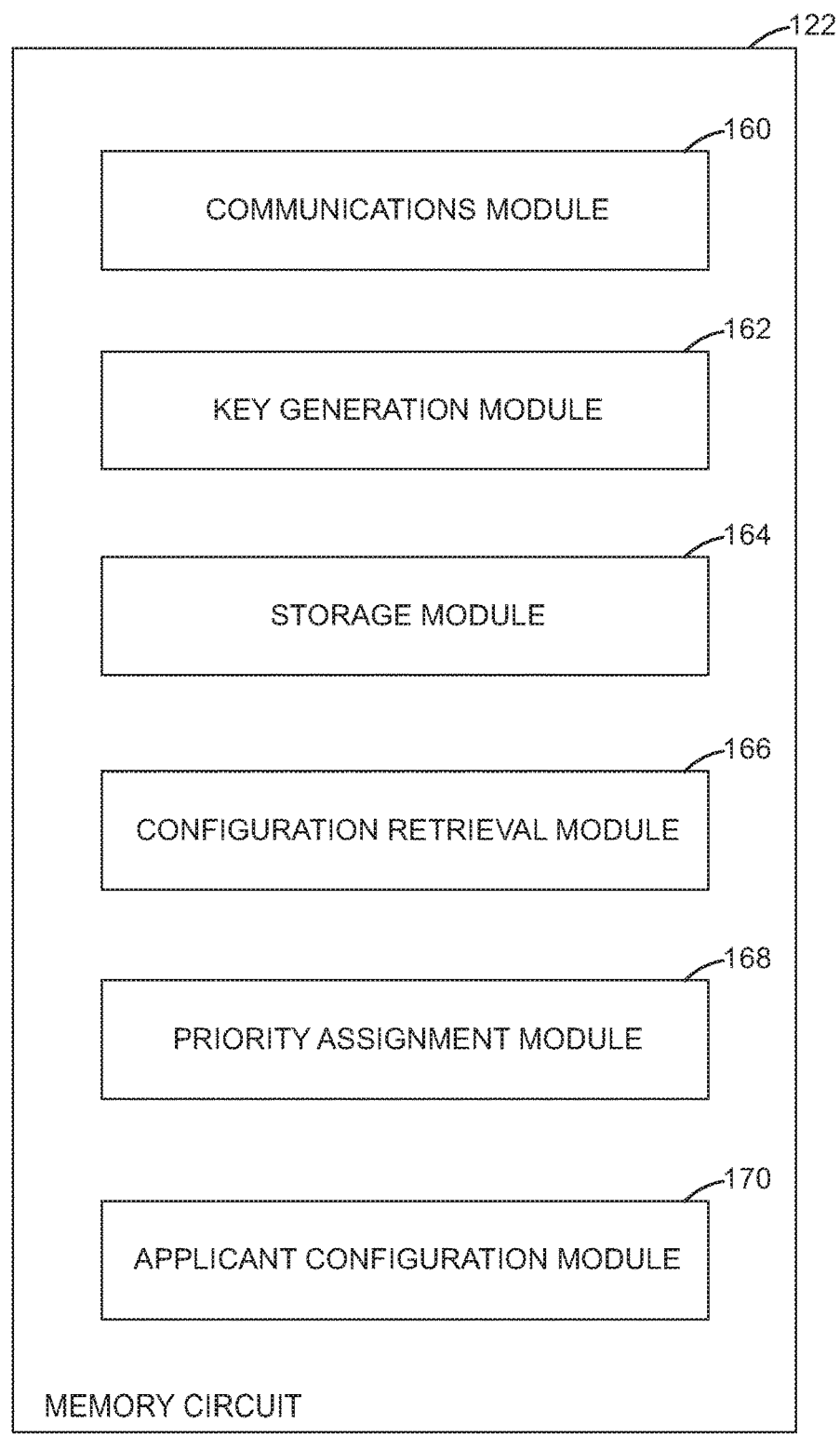
FIG. 7 is a logical block diagram illustrating a memory circuit for storing software modules executed by a POS terminal according to embodiments of the present disclosure.

FIG. 7 illustrates an embodiment of the memory circuit 122 comprising software modules for performing embodiments as discussed above. As seen in FIG. 7, the memory circuit 122 comprises a communications module 150, a key generation module 152, a configuration file storage module 154, a configuration file retrieval module 156, a priority level assignment module 158, and an application configuration module 160.

The communications module 150 is configured to receive one or more configuration files from any of a variety of remotely located devices. Such devices include the control server 14, the enterprise server 16, and each of the illustrated peripheral devices 24, 26, 28, 30. In addition, the communications module 140 is configured to communicate such data and information via a wire-based and/or wireless-based interface, as needed or desired. The key generation module 152 is configured to generate a unique key for a given peripheral device 24, 26, 28, 30 upon receiving information associated with the given peripheral device 24, 26, 28, 30. Such information may include, for example, identifiers or other similar information that is unique to the peripheral device 24, 26, 28, 30. The configuration file storage module 154 is configured to store the configuration files, and their respective updates, in memory circuit 122 and/or on control server 14. The configuration file retrieval module 156 is configured to retrieve one or more configuration files from the memory circuit 122, and/or one or both of the servers 14, 16. If no configuration files are found, the configuration retrieval module 156 may generate a default configuration file, as stated above. The priority assignment module 158 is configured to compare the configuration information stored in a local cache at POS terminal 22 (if any) to the configuration data stored in the configuration file(s). Based on the results of that matching analysis, and/or on the location from where the configuration files are retrieved or generated, the priority assignment module 158 is configured to assign a priority level to a configuration file. The application configuration module 160 is configured to configure the POS application 128 according to the prioritized configuration file, as described above.

The present embodiments may, of course, be carried out in other ways than those specifically set forth herein without departing from essential characteristics of the disclosure. Therefore, the present embodiments are to be considered in all respects as illustrative and not restrictive, and all changes coming within the meaning and equivalency range of the appended claims are intended to be embraced therein.

What is claimed is:

1. A computer-implemented method comprising:
   generating, at a Point-of-Sale (POS) terminal, a key for a POS peripheral device responsive to detecting a predetermined trigger event;
   obtaining a configuration file for the POS peripheral device based on the key, wherein the configuration file comprises configuration data defining configuration settings for the POS peripheral device and environmental context information for the POS terminal;
   assigning a priority level to the configuration file based on a comparative analysis of the configuration data in the configuration file to configuration information stored in a cache at the POS terminal; and
   configuring a POS application program executing at the POS terminal with the configuration data in the configuration file, wherein the configuration data controls the POS application to update the configuration of the POS application program for the POS peripheral device based on the priority level.

2. The computer-implemented method of claim 1 wherein assigning a priority level to the configuration file comprises assigning a priority level to the configuration file based on a comparative analysis of the environmental context information to the configuration information stored in the cache at the POS terminal.

3. The computer-implemented method of claim 1 further comprising:
   receiving, at the POS terminal, a plurality of configuration files associated with the POS peripheral device, each configuration file comprising configuration data defining configuration settings for the POS peripheral device and environmental context information for the POS terminal;

selecting at least one of the plurality of configuration files based on the priority level; and configuring the POS application with the configuration data in the selected configuration file.

4. The computer-implemented method of claim 1 wherein generating a key for the POS peripheral device comprises generating the key based on information received from the POS peripheral device.

5. The computer-implemented method of claim 1 wherein obtaining a configuration file for the POS peripheral device based on the key comprises retrieving the configuration file from at least one of a local memory circuit at the POS terminal, a control server communicatively connected to the POS terminal, and an enterprise server communicatively connected to the POS terminal.

6. The computer-implemented method of claim 5 wherein assigning a priority level to the configuration file further comprises assigning the priority level to the configuration file based on a device where the configuration file is stored.

7. The computer-implemented method of claim 1 wherein obtaining a configuration file for the POS peripheral device based on the key comprises retrieving the configuration file from a local memory circuit at the POS terminal if the configuration file is stored in the local memory circuit.

8. The computer-implemented method of claim 7 wherein obtaining a configuration file for the POS peripheral device based on the key further comprises retrieving the configuration file from a control server communicatively connected to the POS terminal if the configuration file is not stored in the local memory circuit.

9. The computer-implemented method of claim 6 wherein if the configuration file is not stored in the local memory circuit and is not stored at the control server, obtaining a configuration file for the POS peripheral device based on the key further comprises:

sending a configuration file request message to an enterprise server device via a communications network;

receiving the configuration file if the enterprise server device stored the configuration file; and generating a default configuration file for the POS peripheral device if the configuration is not stored at the enterprise server.

10. The computer-implemented method of claim 1 further comprising generating a notification for a user of the POS terminal to provide additional information associated with allowing the POS application to operate with the POS peripheral device.

11. A Point-of-Sale (POS) terminal comprising:

a communications interface circuit configured to communicate data with one or more remote devices via a communications network; and a processing circuit configured to:

generate a key for a POS peripheral device communicatively connected to the POS terminal responsive to detecting a predetermined trigger event;

obtain a configuration file for the POS peripheral device based on the key, wherein the configuration file comprises configuration data defining configuration settings for the POS peripheral device and environmental context information for the POS terminal;

assign a priority level to the configuration file based on a comparative analysis of the configuration data in the configuration file to configuration information stored in a cache at the POS terminal; and configure a POS application program executing at the POS terminal with the configuration data in the configuration file, wherein the configuration data controls the POS application to update the configuration of the POS application program for the POS peripheral device based on the priority level.

12. The POS terminal of claim 11 wherein the processing circuit is further configured to assign a priority level to the configuration file based on a comparative analysis of the environmental context information to the configuration information stored in the cache at the POS terminal.

13. The POS terminal of claim 11 wherein the processing circuit is further configured to:

receive, via the communications interface, a plurality of configuration files associated with the POS peripheral device, each configuration file comprising configuration data defining configuration settings for the POS peripheral device and environmental context information for the POS terminal;

selecting at least one of the plurality of configuration files based on the priority level; and configuring the POS application with the configuration data in the selected configuration file.

14. The POS terminal of claim 11 wherein the processing circuit is further configured to generate the key for the POS peripheral device based on information received from the POS peripheral device.

15. The POS terminal of claim 11 wherein the processing circuit is further configured to:

obtain the configuration file from at least one of a local memory circuit at the POS terminal, a control server communicatively connected to the POS terminal, and an enterprise server communicatively connected to the POS terminal; and assign the priority level to the configuration file according to whether the configuration file was obtained from the local memory circuit, the control server, or the enterprise server.

16. The POS terminal of claim 11 further comprising a local memory circuit, and wherein the processing circuit is further configured to obtain the configuration file for the POS peripheral device from the local memory circuit if the configuration file is stored in the local memory circuit.

17. The POS terminal of claim 16 wherein the processing circuit is further configured to obtain the configuration file for the POS peripheral device from a control server communicatively connected to the POS terminal if the configuration file is not stored in the local memory circuit.

18. The POS terminal of claim 17 wherein if the configuration file is not stored in the local memory circuit, and if the configuration file is not stored at the control server, the processing circuit is further configured to:

send a configuration file request message to an enterprise server;

receive the configuration file if the enterprise server stored the configuration file; and generate a default configuration file for the POS peripheral device if the configuration is not stored at the enterprise server.

19. The POS terminal of claim 11 wherein processing circuit is further configured to prompt a user of the POS terminal to provide additional information associated with allowing the POS application to operate with the POS peripheral device.

20. A computer-readable storage medium comprising computer program code stored thereon that, when executed by a processing circuit of a Point-of-Sale (POS) terminal, configures the processing circuit to:

generate a key for a POS peripheral device communicatively connected to the POS terminal responsive to detecting a predetermined trigger event;

obtain a configuration file for the POS peripheral device based on the key, wherein the configuration file comprises configuration data defining configuration settings for the POS peripheral device and environmental context information for the POS terminal;

assign a priority level to the configuration file based on a comparative analysis of the configuration data in the configuration file to configuration information stored in a cache at the POS terminal; and configure a POS application program executing at the POS terminal with the configuration data in the configuration file, wherein the configuration data controls the POS application to update the configuration of the POS application program for the POS peripheral device based on the priority level.

* * * * *